United States Patent [19]
Urbach

[11] Patent Number: 6,039,337
[45] Date of Patent: Mar. 21, 2000

[54] VEHICLE SUSPENSION WITH STROKE-REDUCING LINKAGE

[75] Inventor: Brian A. Urbach, Rochester Hills, Mich.

[73] Assignee: TRW Inc., Lyndhurst, Ohio

[21] Appl. No.: 08/962,692

[22] Filed: Nov. 3, 1997

[51] Int. Cl.[7] ............................. B60G 3/20; B60G 11/16
[52] U.S. Cl. ......................... 280/124.134; 280/124.136; 280/124.139; 267/254
[58] Field of Search ................... 280/124.135, 124.136, 280/124.138, 124.139, 124.141, 124.145, 124.154, 124.155, 124.134, 124.143, 124.179, FOR 117, FOR 124, FOR 126, FOR 147, FOR 148, FOR 153, FOR 158, FOR 149, FOR 154; 267/254

[56] References Cited

U.S. PATENT DOCUMENTS

| | | | |
|---|---|---|---|
| 2,260,634 | 10/1941 | Mullner | 280/124.179 |
| 4,927,169 | 5/1990 | Scaduto | 280/124.136 |
| 4,964,651 | 10/1990 | Kubo . | |

FOREIGN PATENT DOCUMENTS

| | | | |
|---|---|---|---|
| 3-231010 | 10/1991 | Japan | 280/FOR 154 |
| 398420 | 2/1974 | U.S.S.R. | 280/FOR 147 |

OTHER PUBLICATIONS

"Automotive Suspension and Steering Systems", Thomas W. Birch, Chapter 8, pp. 184–197.

*Primary Examiner*—Peter C. English
*Attorney, Agent, or Firm*—Tarolli, Sundheim, Covell, Tummino & Szabo L.L.P.

[57] ABSTRACT

An apparatus includes a structural vehicle part (14), a control arm (20) which is pivotal relative to the vehicle part (14), and a shock absorber (52) which is interposed between the control arm (20) and the vehicle part (14). The apparatus (10) further includes a stroke-reducing linkage (24) interposed between the control arm (20) and the shock absorber (52). Preferably, the stroke-reducing linkage (24) includes a lever (60) supported on the vehicle part (14) for pivotal movement about an axis (37) that is fixed relative to the vehicle part (14). The shock absorber (52) is pivotally connected to the lever (60) at a first joint (70) that is spaced a first distance (L1) from the axis (37). The control arm (20) is pivotally connected to the lever (60) at a second joint (76) that is spaced a second, greater distance (L2) from the axis (37).

1 Claim, 2 Drawing Sheets

VEHICLE SUSPENSION WITH STROKE-REDUCING LINKAGE

FIELD OF THE INVENTION

The present invention relates to a vehicle suspension system, and particularly relates to a control arm and a shock absorber in a vehicle suspension system.

BACKGROUND OF THE INVENTION

A vehicle suspension system includes a plurality of parts that connect the vehicle wheels to the vehicle frame. For example, a steerable vehicle wheel is connected to the frame by parts including a control arm and a steering knuckle. The steering knuckle is connected directly to the wheel. The control arm has an outer end which is pivotally connected to the steering knuckle. The control arm further has one or two inner ends, each of which is pivotally connected to the frame. In this arrangement, the control arm helps to support the wheel for vertical movement relative to the frame, and simultaneously blocks horizontal movement of the wheel relative to the frame. A spring acts between the control arm and the frame to absorb suspension loads upon vertical movement of the control arm relative to the frame. A shock absorber acts between the control arm and the frame to damp vertical oscillations of the spring.

SUMMARY OF THE INVENTION

In accordance with the present invention, an apparatus comprises a structural vehicle part, a control arm, and a shock absorber. The control arm is pivotal relative to the vehicle part. The shock absorber is interposed between the control arm and the vehicle part. The apparatus further comprises a stroke-reducing linkage which is interposed between the control arm and the shock absorber.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF A PREFERRED EMBODIMENT

Figure 1:
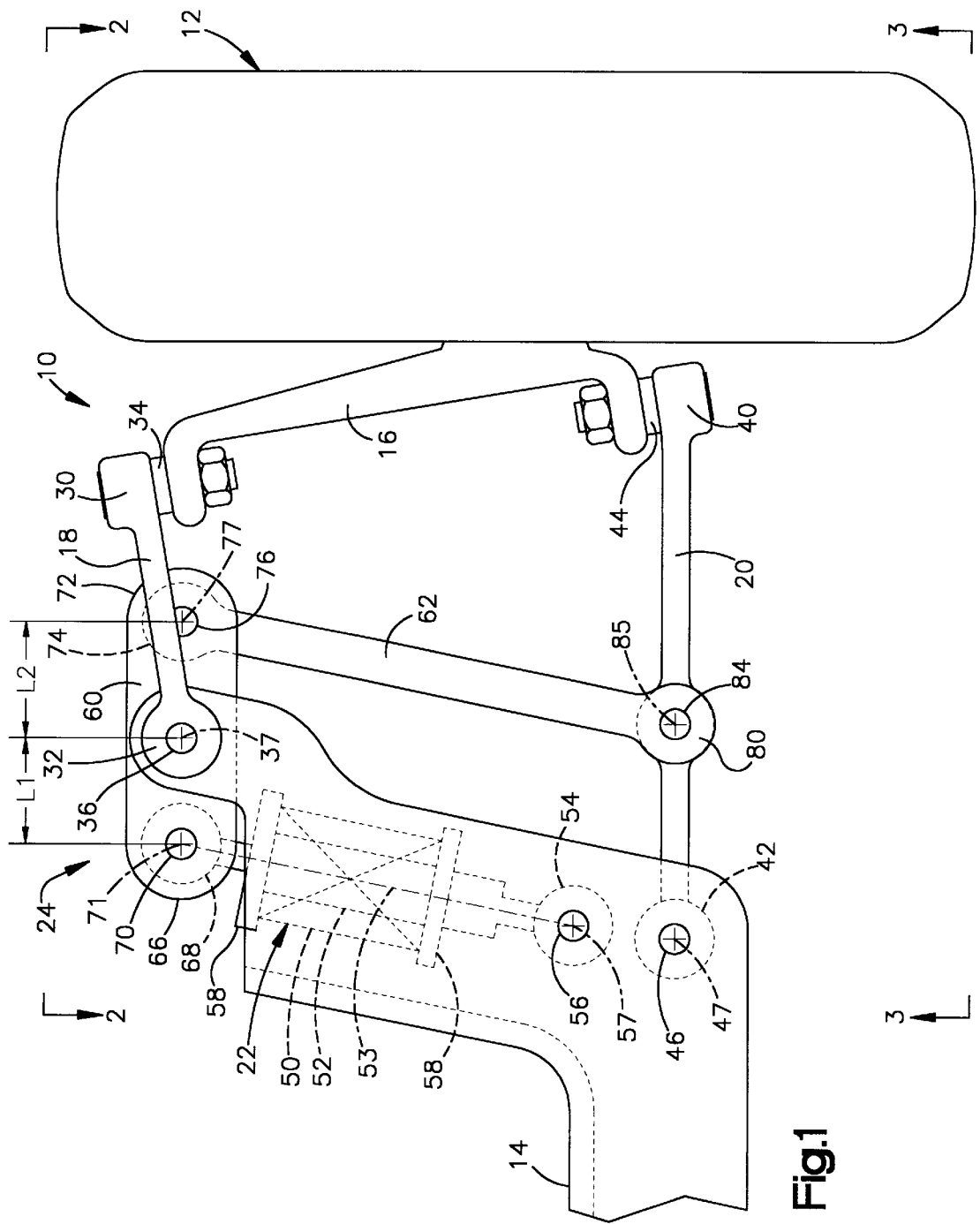
FIG. 1 is a front view of a vehicle suspension apparatus comprising a preferred embodiment of the present invention.

A vehicle suspension apparatus 10 comprising a preferred embodiment of the present invention is shown partially in FIG. 1. The apparatus 10 connects a vehicle wheel 12 to the vehicle frame 14. Although the present invention is applicable to both steerable and non-steerable wheels, the wheel 12 shown by way of example in FIG. 1 is a steerable wheel. Accordingly, the apparatus 10 includes a steering knuckle 16 which connects the wheel 12 to a steering linkage (not shown) in a known manner. Other parts of the apparatus 10 that are shown in FIG. 1 include an upper control arm 18, a lower control arm 20, and a spring/damper assembly 22. The control arms 18 and 20 connect the steering knuckle 16 to the frame 14. A linkage 24 acts between the lower control arm 20 and the spring/damper assembly 22 in accordance with the present invention.

Figure 2:
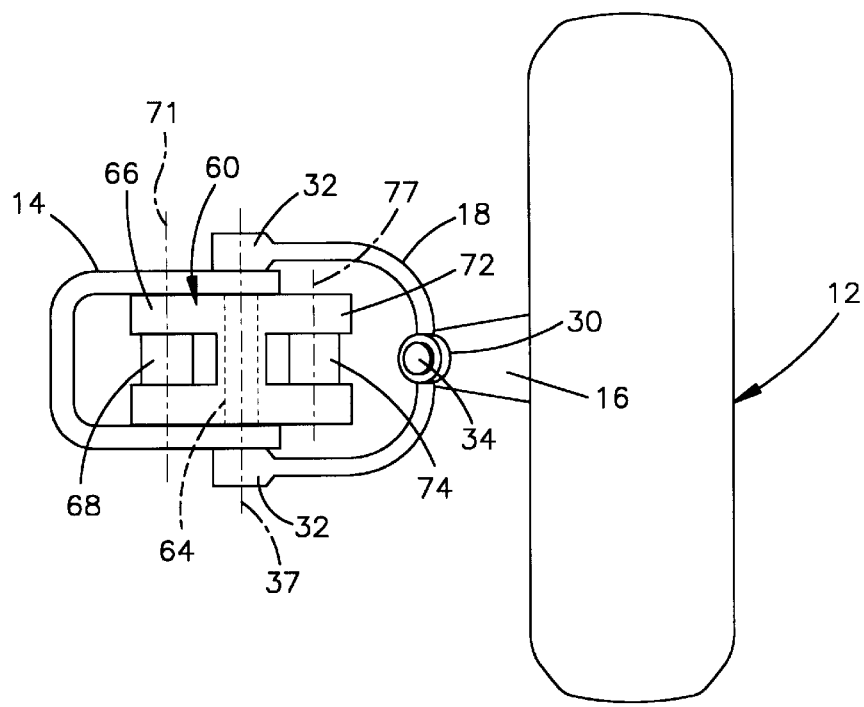
FIG. 2 is a top view taken on line 2—2 of FIG. 1.
Figure 3:
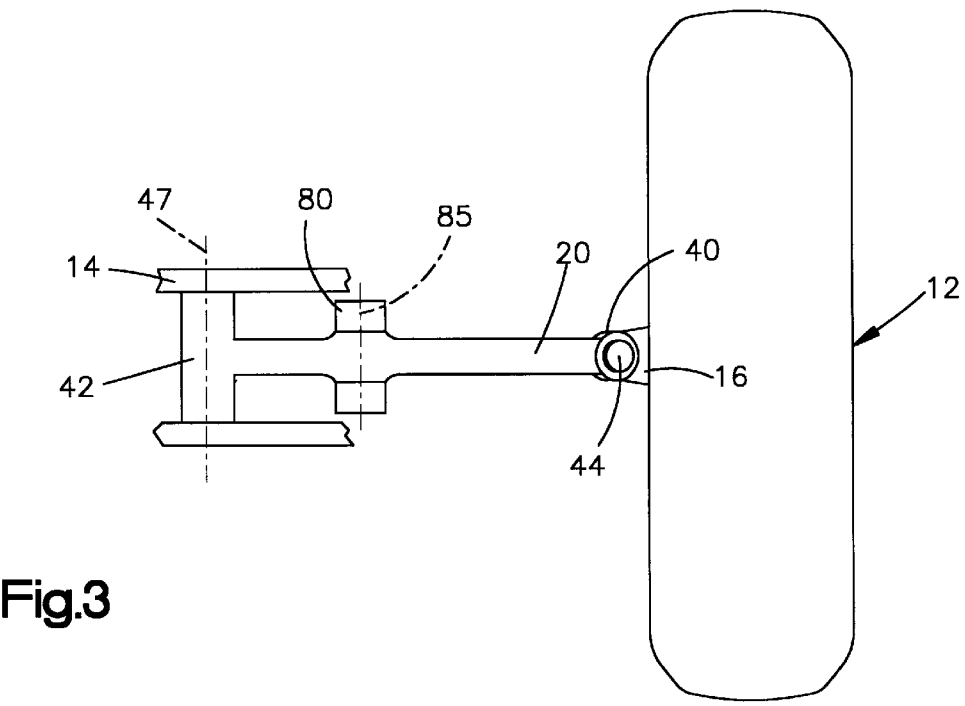
FIG. 3 is a bottom view taken on line 3—3 of FIG. 1.

As shown in FIG. 2, the upper control arm 18 is a U-shaped part with an outer end portion 30 and a pair of inner end portions 32. An upper ball joint 34 connects the outer end portion 30 of the upper control arm 18 to the steering knuckle 16. The inner end portions 32 of the upper control arm 18 are connected to the frame 14 by a corresponding pair of joints 36, one of which is shown in FIG. 1. The joints 36 are centered on an upper pivot axis 37 which is fixed relative to the frame 14. The joints 36, as well as the other pivotal joints described below, may comprise any suitable bushing or bearing structures known in the art.

The lower control arm 20 is a linear part, as compared with the U-shaped upper control arm 18, and has an outer end portion 40 and an inner end portion 42. A lower ball joint 44 connects the outer end portion 40 of the lower control arm 20 to the steering knuckle 16. The inner end portion 42 of the lower control arm 20 is pivotally connected to the frame 14 at a joint 46 defining a lower pivot axis 47. The lower pivot axis 47 is parallel to the upper pivot axis 37, and also is fixed is relative to the frame 14. The wheel 12 and the steering knuckle 16 are movable vertically relative to the frame 14 upon pivotal movement of the control arms 18 and 20 about the axes 37 and 47, respectively.

The spring/damper assembly 22 includes a spring 50 and a damper 52, each of which is centered on a longitudinal axis 53. The damper 52, which is more commonly referred to as a shock absorber, has a lower end portion 54 pivotally connected to the frame 14 at a joint 56. The joint 56 defines a fixed intermediate axis 57 which is parallel to the fixed upper and lower axes 37 and 47. A pair of spring seats 58 are spaced apart along the length of the shock absorber 52. The spring 50 extends axially between the spring seats 58, and is compressible and extendible between the spring seats 58 under the influence of vehicle suspension loads. The shock absorber 52 damps oscillations of the spring 50 in a known manner.

The linkage 24 includes a lever 60 and a push rod 62. A joint 64 (FIG. 2) supports the lever 60 on the frame 14 for movement pivotally about the fixed upper axis 37. A first end portion 66 of the lever 60 is connected to an upper end portion 68 of the shock absorber 52 at a first movable joint 70. The first movable joint 70 defines a first movable axis 71 which is parallel to the fixed axes 37, 47 and 57. A second, opposite end portion 72 of the lever 60 is connected to an upper end portion 74 of the push rod 62 at a second movable joint 76. The second movable joint 76 defines a second movable axis 77 which also is parallel to the fixed axes 37, 47 and 57. A lower end portion 80 of the push rod 62 is pivotally connected to the lower control arm 20 at a third movable joint 84 defining a third movable axis 85 parallel to the fixed axes 37, 47 and 57. The third movable joint 84 is closer to the joint 46 than to the joint 44, as shown in FIG. 1.

The linkage 24 transmits vehicle suspension loads from the lower control arm 20 to the spring/damper assembly 22. Specifically, when a suspension load moves the wheel 12 and the steering knuckle 16 vertically upward relative to the frame 14, the lower control arm 20 pivots about the fixed lower axis 47 in a counterclockwise direction, as viewed in FIG. 1. The push rod 62 is then lifted by the lower control arm 20. The second end portion 72 of the lever 60 moves upward with the upper end portion 74 of the push rod 62. The lever 60 is thus moved pivotally about the fixed upper axis 37 in the counterclockwise direction such that the first end portion 66 of the lever 60 moves downward. The first end portion 66 of the lever 60 then pushes the upper end portion 68 of the shock absorber 52 downward along the longitudinal axis 53 such that the spring seats 58 move axially toward each other through a compressive stroke against the bias of the spring 50.

In accordance with a particular feature of the present invention, the lever 60 has a first length L1 extending between the fixed upper axis 37 and the first movable axis 71. The lever 60 has a second, greater length L2 extending between the fixed upper axis 37 and the second movable axis 77. When a vehicle suspension load pivots the lever 60 about the fixed upper axis 37 in the counterclockwise direction, as described above, the differing lengths L1 and L2 provide a mechanical advantage such that the compressive stroke at the spring/damper assembly 22 is less than it would be if the length L2 were not greater than the length L1. This stroke-reducing feature of the present invention enables the spring/damper assembly 22 to be smaller than it otherwise would have to be to accommodate a given amount of vertical movement of the wheel 12.

The present invention has been described with reference to a preferred embodiment. From the foregoing description, those skilled in the art will perceive improvements, changes and modifications. For example, the apparatus 10 in the preferred embodiment acts between the vehicle wheels 12 and the vehicle frame 14. However, a suspension apparatus constructed in accordance with the present invention could alternatively act between the vehicle wheels and a different structural part of the vehicle such as, for example, a reinforced body part or a cradle. Such improvements, changes and modifications within the skill of the art are intended to be covered by the appended claims.

Having described the invention, the following is claimed:

1. Apparatus comprising:

a vehicle steering knuckle (16);

a structural vehicle part (14);

a control arm (20) which is pivotal relative to said vehicle part at a first joint (46) and is pivotal relative to said vehicle steering knuckle at a second joint (44);

a lever supported on said vehicle part for movement pivotally about an axis which is fixed relative to said vehicle part;

a shock absorber pivotally connected to said lever at a third joint (70) which is spaced a first distance from said axis, a rigid single push rod pivotally connected to said lever at a fourth joint (76) which is spaced a second, greater distance than said first distance from said axis;

said single rigid push rod being pivotally connected at one of its ends to said control arm and being pivotally connected at its other end to said lever at said fourth joint, the connection of said one end of said push rod to said control arm being closer to said first joint (46) than to said second joint (44);

said shock absorber extending from said third joint to a fifth joint at which said shock absorber is pivotally connected to said vehicle part, said axis being located between said third and fourth joints.

* * * * *